United States Patent [19]

Matsumoto et al.

[11] Patent Number: 5,266,543

[45] Date of Patent: Nov. 30, 1993

[54] CATALYTIC COMPOSITE FOR DEODORIZING ODOROUS GASES AND A METHOD FOR PREPARING THE SAME

[75] Inventors: Tomohide Matsumoto, Yamatotakada; Kenji Tabata, Ikoma; Masao Maki, Nabari, all of Japan

[73] Assignee: Matsushita Electric Industrial Co., Ltd., Osaka, Japan

[21] Appl. No.: 915,153

[22] Filed: Jul. 16, 1992

[30] Foreign Application Priority Data

Jul. 31, 1991 [JP] Japan .................. 3-191618
Nov. 12, 1991 [JP] Japan .................. 3-295527

[51] Int. Cl.$^5$ ................. B01J 23/52; B01J 23/76; B01J 29/04
[52] U.S. Cl. ................................... 502/66
[58] Field of Search ................. 502/66, 330

[56] References Cited

U.S. PATENT DOCUMENTS 3,691,097 9/1972 Stiles et al. ............... 252/440
4,698,324 10/1987 Haruta et al. ............. 502/243

FOREIGN PATENT DOCUMENTS 0361385 4/1990 European Pat. Off. .
0395856 7/1990 European Pat. Off. .
60-238148 11/1985 Japan .
62-155937 7/1987 Japan .
1094945 4/1989 Japan .
4066124 3/1992 Japan .

*Primary Examiner*—W. J. Shine
*Attorney, Agent, or Firm*—Panitch Schwarze Jacobs & Nadel

[57] ABSTRACT

A catalytic composite for deodorizing odorous gases is provided. The composite comprises: ceramic fibers; zeolite supported on the surface of and in the interstices between the ceramic fibers; and gold and an iron oxide both supported mainly on the zeolite; the catalytic composite being so formed as to allow a gas to pass therethrough.

17 Claims, 4 Drawing Sheets

CATALYTIC COMPOSITE FOR DEODORIZING ODOROUS GASES AND A METHOD FOR PREPARING THE SAME

BACKGROUND OF THE INVENTION

1. Field of the Invention

The present invention relates to a catalytic composite for deodorizing odorous gases which oxidizes nitrogen-containing odorous compounds such as ammonia and amines to decompose them, and more particularly, it relates to a catalytic composite for deodorizing odorous gases which can attain excellent deodorizing or oxidation activity at ordinary temperature. It also relates to a method for preparing the catalytic composite, and a deodorizing apparatus using the catalytic composite.

2. Description of the Prior Art

As a deodorizer for removing odors, adsorbents such as active carbon which physically adsorb odorous substances are widely used. But these adsorbents cannot be used after the odorous substances are adsorbed onto the entire surface thereof. At present, there are very few deodorizers which can be used repeatedly.

In recent years, there has been proposed an ozone-utilized deodorizing apparatus which employs ozone which is known to have excellent oxidation activity and also employs an ozone-decomposing catalyst for decomposing excessive ozone through oxidation. This deodorizing apparatus can be used repeatedly for removing odors. However, the ozone-utilized deodorizing apparatus requires an ozone generator, and also requires a system for reducing the leakage of ozone to a level of 0.1 ppm or lower because ozone is harmful to the human body. The necessity of such auxiliary devices makes the whole deodorizing apparatus larger in size and increases the production cost thereof.

On the other hand, as a deodorizer for industrial use, a variety of catalysts for the catalytic oxidation of odorous substances have been put into practical use. Such oxidation catalysts can be used repeatedly because they decompose the odorous substances into odorless substances. But the oxidation catalysts require heating to a temperature of at least 200° C. in order to attain their catalytic activity. This necessitates the use of a heater in combination with the catalyst. Therefore, there has been a demand for a catalyst which can attain catalytic activity at low temperatures.

As a catalyst capable of attaining catalytic activity at low temperatures, hopcalite containing manganese oxide and copper oxide as its main components has been put into practical use. However, this catalyst has a disadvantage in that its low-temperature catalytic activity is rapidly lowered by moisture.

As another catalyst having low-temperature catalytic activity, a catalyst containing a metal oxide and gold has been proposed (Japanese Laid-Open Patent Publication No. 60-238148). This gold-metal oxide catalyst is supported on a carrier such as alumina to form a catalytic composite, and used as an oxidation catalyst for CO. The gold-metal oxide catalyst exhibits excellent efficiency in the combustion of carbon monoxide at a low temperature of, for example, −30° C. However, the catalytic composite prepared by this method cannot attain sufficient efficiency in removing odors. The reason is that the porosity of the carrier is not sufficient to provide the required oxygen. For removing odors, a temperature of 200° C. or more is required.

The above-mentioned type of catalytic composite which includes a carrier and a gold-metal oxide catalyst supported thereon can be prepared by coprecipitation (U.S. Pat. No. 4,698,324). In this method, a ceramic carrier is immersed in an aqueous solution containing a water-soluble salt of gold and another metal, and also containing urea and/or acetamide, after which catalytic components, i.e., the gold and metal oxide, are allowed to precipitate on the carrier.

In the preparation of such a catalytic composite, the catalytic components are required to be firmly supported on the carrier made of an inorganic material so as to ensure sufficient catalytic activity in the resultant catalytic composite. However, in the catalytic composite prepared by the above-described conventional method such as immersion, the catalytic components tend to drop from the carrier due to the poor adhesion therebetween. This lowers the catalytic activity of the catalytic composite.

In order to obtain a catalytic composite with high activity, there has been proposed another method for preparing this type of catalytic composite (Japanese Laid-Open Patent Publication No. 1-94945). In this method, first, a metal oxide such as an iron oxide P9619 is supported on a carrier made of alumina, silica, zeolite, titania, or the like so that the content of the metal oxide in the resulting carrier is 20 percent by weight or more. Then, the thus obtained carrier is immersed in an alkaline solution of pH 7.5 or more. While the pH of the alkaline solution is maintained in the range of 7.5 to 9.5, a solution of a gold compound such as chloroauric acid is added to the alkaline solution, so that the gold compound precipitates on the carrier. The carrier having the gold compound thereon is then calcined, resulting in a catalytic composite. The catalytic activity of the resulting catalytic composite including the carrier and the gold-metal oxide catalyst supported thereon is as high as that of a gold-metal oxide catalyst used alone without a carrier. However, this method requires a complicated production process as described above and accordingly requires a large amount of equipment, thereby increasing the production cost.

In general, in order to improve the catalytic performance of a catalytic composite for deodorizing odorous gases, the carrier for supporting catalysts thereon is so formed as to have a large surface area in contact with air. For example, a ceramic such as silica, alumina, zeolite, cordierite, or mullite is formed into a honeycomb structure in order to obtain a large area on which a catalyst can be carried, and used as a carrier. Generally, the catalyst is applied to the carrier by spraying or immersion. In this case, however, the carrier of this type is usually obtained by a sintering with high temperature, so that the degree of porosity is low. Accordingly, catalytic components can be supported only on the surface of the ceramic carrier, so that the catalytic activity is low. Furthermore, when zeolite is used as a carrier, the carrier has poor mechanical strength and is expensive.

SUMMARY OF THE INVENTION

A catalytic composite for deodorizing odorous gases of the present invention comprises:
ceramic fibers;
zeolite supported on the surface of and in the interstices between the ceramic fibers; and
gold and an iron oxide both supported mainly on the zeolite, the catalytic composite being so formed as to allow a gas to pass therethrough.

In a preferred embodiment, the ceramic fibers, the zeolite, the gold and the iron oxide constitute a sheet, the sheet being in the form of a sheet unit of a ventilated structure having a plurality of vent holes.

In a preferred embodiment, the ventilated structure is a honeycomb structure.

In a preferred embodiment, the content of the gold is in the range of 0.2 to 0.9 g/liter (the volume of the catalytic composite), and the content of the iron is in the range of 0.3 to 1.5 percent by weight based on the weight of the catalytic composite.

A first method for preparing a catalytic composite for deodorizing odorous gases of the present invention comprises the steps of:

preparing a carrier sheet from a slurry by the use of a paper making method, the slurry mainly containing ceramic fibers, an inorganic binder and a fine powder of zeolite;

forming the carrier sheet into a carrier-sheet unit of a ventilated structure with a plurality of vent holes, and calcining the carrier-sheet unit, thereby obtaining a carrier;

immersing the carrier in an aqueous solution of a water-soluble gold compound and a water-soluble iron salt so that the water-soluble gold compound and the water-soluble iron salt are supported on the carrier; and drying and calcining the carrier having the water-soluble gold compound and water-soluble iron salt supported thereon.

In a preferred embodiment, the calcination of the carrier having the water-soluble gold compound and water-soluble iron salt supported thereon is performed at a temperature of 200° to 350° C. in an atmospheric air.

A second method for preparing a catalytic composite for deodorizing odorous gases of the present invention comprises the steps of:

preparing a catalytic sheet from a slurry by a paper-making method, the slurry containing ceramic fibers, an inorganic binder, a fine powder of zeolite, gold and an iron oxide; and forming the catalytic sheet into a catalytic-sheet unit of a ventilated structure with a plurality of vent holes, and then drying and calcining the catalytic-sheet unit.

In a preferred embodiment, the calcination of the catalytic-sheet unit is performed at a temperature of 200° to 350° C. in an atmospheric air.

A third method for preparing a deodorizing catalytic composite of the present invention comprises the steps of:

preparing an iron oxide-supported carrier sheet from a slurry by the use of a paper-making method, the slurry containing ceramic fibers, an inorganic binder, a fine powder of zeolite and an iron oxide;

forming the iron oxide-supported carrier sheet into a carrier-sheet unit of a ventilated structure with a plurality of vent holes, and then drying and calcining the carrier-sheet unit, thereby obtaining an iron oxide-supported carrier; and immersing the iron oxide-supported carrier in an aqueous solution containing a water-soluble gold compound so that the water-soluble gold compound is supported on the iron oxide-supported carrier, and then drying and calcining the iron oxide-supported carrier with the water-soluble gold compound thereon.

In a preferred embodiment, the calcination of the iron oxide-supported carrier with the chloroauric acid thereon is performed at a temperature of 200° to 350° C. in an atmospheric air.

In a preferred embodiment, in the first, second and third method, the gold content of the catalytic composite is in the range of 0.2 to 0.9 g/liter (the volume of the catalytic composite), and the iron content of the catalytic composite is in the range of 0.3 to 1.5 percent by weight based on the weight of the catalytic composite.

A deodorizing apparatus of the present invention comprises:

a duct having an inlet and an outlet;

a fan disposed in or outside of the duct;

a first catalytic composite for deodorizing odorous gases which includes a porous carrier mainly made of ceramic fibers having zeolite supported thereon and also includes gold and an iron oxide supported on the porous carrier; and a second catalytic composite for deodorizing odorous gases which includes manganese and an iron oxide as main components, wherein the first and second catalytic composites are placed in the duct, and air is sucked into the duct by means of the fan, thereby creating an air flow through the duct from the inlet to the outlet.

In a preferred embodiment, the first catalytic composite is positioned downstream of the second catalytic composite in the direction of the air flow.

In a preferred embodiment, the first catalytic composite is the catalytic composite of the present invention.

Thus, the invention described herein makes possible the advantages of (1) providing a catalytic composite for deodorizing odorous gases which includes gold and an iron oxide as catalysts carried on a ceramic carrier, and has an excellent deodorizing activity; (2) providing a catalytic composite of the above-mentioned type in which the catalyst is securely supported on the carrier and has a large specific surface area; (3) providing a method for preparing the catalytic composite which employs a simplified process of supporting the catalysts on the carrier, thereby attaining high productivity and low production cost; and (4) providing a deodorizing apparatus using the catalytic composite, which has a simplified structure and attains high efficiency in deodorizing odorous gases.

These and other advantages of the present invention will become apparent to those skilled in the art upon reading and understanding the following detailed description with reference to the accompanying figures.

DESCRIPTION OF THE PREFERRED EMBODIMENTS

A catalytic composite for deodorizing odorous gases according to the present invention includes a catalyst carrier essentially consists of ceramic fibers and zeolite supported thereon. As the material for the ceramic fibers, for example, ceramics such as silica and alumina are used. The ceramic fibers preferably have a mean diameter in the range of 2 to 10 $\mu$m and a mean length in the range of 3 to 10 mm. The zeolite supported on the ceramic fibers is usually in the form of particles, the size of which is preferably in the range of 5 to 10 $\mu$m. On this zeolite-containing ceramic carrier, gold and an iron oxide both serving as catalysts are supported. Preferably, the iron oxide is $Fe_2O_3$. The catalytic composite of the present invention can be prepared by different methods as will be described later. In some of the methods, a preliminary form of each catalyst is first supported on the carrier, after which the carrier is calcined so that the catalyst is obtained thereon. For example, the preliminary form of gold is a water-soluble gold compound such as chloroauric acid, and the preliminary form of the iron oxide is a water-soluble iron salt such as iron nitrate ($Fe(NO_3)_2$ and/or $Fe(NO_3)_3$).

Figure 1:
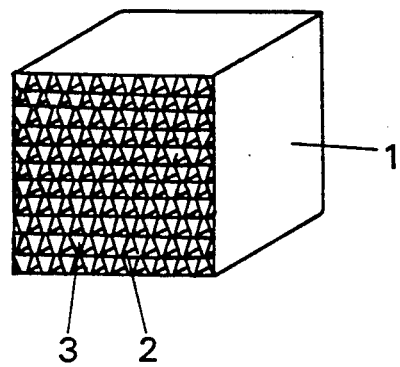
FIG. 1 is a perspective view showing a catalytic composite for deodorizing odorous gases according to the present invention.

In the catalytic composite according to the present invention, zeolite is contained in the range of 70 to 120 parts by weight for every 100 parts by weight of the ceramic fibers. The content of gold serving as a main catalyst in the catalytic composite is in the range of 0.2 to 0.9 g/liter (the volume of the catalytic composite). For example, when the catalytic composite is composed of a catalytic sheet formed into a honeycomb structure such as shown in FIG. 1, 0.2 to 0.9 g of gold is contained in every 1 liter of the catalytic sheet (i.e., 1 liter of the catalytic composite including the volume of the holes of its honeycomb structure). The content of the iron oxide in the catalytic composite is, when converted into an iron-content basis, in the range of 0.3 to 1.5 percent by weight based on the weight of the catalytic composite.

A first method for preparing a catalytic composite for deodorizing odorous gases according to the present invention is as follows: First, ceramic fibers and a powder of zeolite, an inorganic binder, and when required, an organic binder are mixed to form a slurry. From this slurry, a carrier sheet is formed by the use of a paper-making method. The inorganic binder is used to ensure the binding of the zeolite powder to the ceramic fibers and the binding between ceramic fibers. Examples of the inorganic binder includes polyvinyl alcohol resin, acrylic resin, and the like. To every 100 parts by weight of ceramic fibers, 2 to 10 parts by weight of the inorganic binder is added. The organic binder is used to improve the paper-making process. Next, the carrier sheet is formed into a desired structure for allowing gases to pass therethrough. For example, a plurality of such carrier sheets are prepared in the same manner as described above, and some of the carrier sheets are corrugated while the others are left unchanged in shape. Then, the corrugated carrier sheets and the uncorrugated carrier sheets are alternately stacked up to form a carrier-sheet unit of a honeycomb structure such as shown in FIG. 1. Alternatively, one of the corrugated carrier sheets and one of the uncorrugated carrier sheets are joined to each other, after which at least one set of the joined sheets is rolled up into a cylindrical carrier-sheet unit of a honeycomb structure. The carrier-sheet unit thus obtained is then calcined at a temperature in the range of 350° to 400° C., resulting in a carrier.

The "honeycomb structure" herein means not only a structure of a "honeycomb" known as a mass of cells each in the shape of a regular hexagon in section, but also a structure such as shown in FIG. 1 which resembles the known "honeycomb" structure.

Next, a water-soluble gold compound such as chloroauric acid and a water-soluble iron salt such as iron nitrate are mixed in a suitable solvent such as water, thereby forming an aqueous solution. The carrier with the honeycomb structure obtained in the above manner is immersed in this aqueous solution, so that the gold compound and water-soluble iron salt (which are the preliminary forms of catalysts as described above) are supported on the carrier. The aqueous solution containing the water-soluble gold compound and iron nitrate is acidic. Since the zeolite strongly adsorbs water having a great dipole moment, the water-soluble gold compound and iron nitrate are strongly adsorbed onto the particles of the zeolite. The zeolite particles are present not only on the surface of the carrier sheet but also in the interstices between the ceramic fibers inside the carrier sheet. Thus, the water-soluble gold compound and iron nitrate can be effectively supported on the zeolite particles inside the carrier sheet as well as on those on the surface of the carrier sheet. Finally, the carrier having the preliminary forms of these catalysts thus supported thereon is dried and calcined, so that gold and an iron oxide are formed, resulting in a catalytic composite of the present invention. The calcining temperature is preferably in the range of 200° to 350° C.

A second method for preparing a catalytic composite for deodorizing odorous gases according to the present invention is as follows: First, ceramic fibers, a powder of zeolite, gold and an iron oxide, and an inorganic binder, and when required, an organic binder are mixed to form a slurry. From this slurry, a catalytic sheet is formed by the use of the paper-making method. Next, in the same manner as in the first method, the catalytic sheet is formed into a catalytic-sheet unit of a desired structure for allowing gases to pass therethrough. This catalytic-sheet unit is dried and calcined, in the same manner as in the first method, resulting in a catalytic composite of the present invention. In the second method, the catalytic sheet containing the catalysts (i.e., the gold and iron oxide) can be formed from the slurry in a single step. This means that the formation of the sheet and the supporting of the catalysts thereon can be carried out in a single step, thereby simplifying the entire production process. Furthermore, catalytic composites of desired sizes and shapes can be produced from the same slurry.

A third method for preparing a catalytic composite for deodorizing odorous gases is as follows: First, ceramic fibers, a powder of zeolite and an iron oxide, and an inorganic binder, and when required, an organic binder are mixed to form a water-based slurry. From this slurry, an iron oxide-supported carrier sheet is prepared by the use of the paper-making method. In the same manner as in the first method, the iron oxide-supported carrier sheet is formed into a carrier-sheet unit of a desired structure for allowing gasses to pass therethrough. The thus obtained carrier-sheet unit is calcined, resulting in an iron oxide-supported carrier. The iron oxide-supported carrier thus obtained includes the ceramic fibers as its framework, and also includes the zeolite and the iron oxide both supported on the ceramic fibers. Then, the iron oxide-supported carrier is immersed in an aqueous solution of a water-soluble gold compound such as chloroauric acid, so that the gold compound is supported on the iron oxide-supported carrier, mainly on the zeolite. In the same manner as in the first method, the iron oxide-supported carrier having the gold compound thereon is then dried and calcined, so that gold is formed on the iron oxide-supported carrier, resulting in a catalytic composite of the present invention. The catalytic composite prepared by this method can attain high catalytic activity because the gold serving as a main catalyst is covered with neither the zeolite nor the iron oxide.

The catalytic composite for deodorizing odorous gases according to the present invention is placed in the flow of a gas containing odorous substances such as ammonia and amines at ordinary temperature. In general, it is used in an air-flow system including a fan for creating air flow. When the air containing odorous substances passes through the holes of the honeycomb structure of the catalytic composite, the odorous substances are selectively adsorbed by the zeolite in the catalytic composite. In the catalytic composite, gold and iron oxide are mainly supported on the zeolite particles, although the gold and iron oxide are present on the surface of and the interstices between the ceramic fibers. As described above, since the zeolite particles are present not only on the surface of the catalytic sheet but also in the interstices between the ceramic fibers inside the sheet, the total surface area of zeolite for adsorbing the odorous substances is large. This enables the adsorption of a large amount of odorous substances. The thus adsorbed odorous substances are decomposed through catalytic oxidation activity into odorless substances, most of which are then released from the catalytic composite.

Although the mechanism of the above-mentioned decomposition of odorous substances has not been clarified yet, the process of the decomposition is considered to be as follows: In the catalytic composite of the present invention, the gold and iron oxide are present closely to each other and are supported on the surface of the zeolite particles. In this state, the gold atoms and the iron oxide constitute an electron cloud which is considered to be useful for the decomposition of odorous substances. Specifically, it is considered that the exchange of electrons between the molecules of the odorous substances (e.g., trimethylamine molecules) and the electron cloud of gold and the iron oxide occurs at their interface. When the odorous substance is trimethylamine, the strength of the binding between N and $CH_3$ in the trimethylamine molecule is reduced by this exchange of electrons. The zeolite, which is a solid acid, further decreases the strength of the above-mentioned binding in the trimethylamine molecule. In other words, zeolite functions as co-catalyst although it also serves as a carrier. The trimethylamine molecule with the thus weakened binding therein is then bound to active oxygen in the ambient air, and eventually, it is decomposed into odorless compounds such as $CO_2$ and $H_2O$, which are then released from the zeolite particles. The other product obtained through this decomposition which includes nitrogen is considered to remain on the zeolite. In this manner, the odorous substances are decomposed through the interaction between ions of these substances and ions of the gold and iron, and thereafter most of the decomposed product is released from the surface of the catalytic composite. After the release of the odorless compounds produced through the decomposition, the surface of the catalytic composite is exposed again to the air to adsorb another amount of odorous substances.

The above-described decomposition occurs at room temperature, and proceeds at a relatively low reaction rate. After odorous substances are adsorbed onto the surface of the catalytic composite, the reaction of decomposition gradually proceeds. Thus, after the adsorption of the odorous substances, the catalytic composite is required to be left in the presence of oxygen for a predetermined period of time in order to decompose the adsorbed substance. Thus, the catalytic composite of the present invention is suitable for intermittent use rather than continuous use, and also suitable for the deodorization of a gas containing odorous substances at a relatively low concentration.

The catalytic composite according to the present invention is porous because it contains ceramic fibers as the framework thereof. Thus, a zeolite fine powder, gold and an iron oxide are supported not only on the surface of the catalytic sheet constituting the catalytic composite but also in the interstices of several tens of micrometers between the ceramic fibers inside the catalytic sheet. This increases the specific surface area of the catalytic composite. Thus, the catalytic composite has a large surface area of 300 $m^2/g$ or more. With the large surface area having catalytic activity, the catalytic composite of the present invention attains high efficiency in adsorbing odorous substances and decomposing them through oxidation.

Furthermore, in the catalytic composite of the present invention, since the zeolite particles having the gold and iron oxide thereon are present in the interstices in between the ceramic fibers of reticular structure, there is very little possibility that the zeolite particles and the gold and iron oxide supported thereon will drop from the catalytic composite. Thus, according to the present invention, high adhesion of the catalysts to the carrier can be attained without the conventionally complicated steps of having supporting catalysts.

Also because of the use of ceramic fibers as its framework, the catalytic composite has high mechanical strength, and can be produced at low cost, as compared with a conventional catalytic composite which includes a carrier of a honeycomb structure formed from zeolite alone.

As described above, the catalytic composite of the present invention is useful mainly in deodorizing a gas including nitrogen-containing odorous substances. According to the present invention, this catalytic composite can be used together with a catalytic composite containing manganese and an iron oxide as its catalytic components. This makes it possible to provide a deodorizing apparatus for deodorizing a gas containing not only nitrogen-containing odorous substances but also sulfur-containing odorous substances such as hydrogen sulfide.

For example, similar to the method of the present invention, a catalytic composite is prepared by using manganese, an iron oxide, zeolite and ceramic fibers, and an inorganic binder. Using the thus prepared catalytic composite as a second catalytic composite, and using the catalytic composite of the present invention as a first catalytic composite, a deodorizing apparatus is produced. The construction of the deodorizing apparatus is, for example, preferably as follows: In a duct through which air to be deodorized is allowed to flow by the use of a fan, the second catalytic composite is placed upstream of the first catalytic composite in the direction of the air flow.

As described above, the catalytic composite according to the present invention includes ceramic fibers as its framework and also includes a fine powder of zeolite, gold and an iron oxide all supported on the ceramic fibers. With this construction, the catalytic composite can decompose nitrogen-containing odorous substances such as ammonia and amines through oxidation at ordinary temperatures. Deodorizing apparatuses employing the catalytic composite of the present invention can effectively deodorize odorous air for a long time without using any auxiliary devices such as an ozone generator or a heater. Particularly, when the catalytic composite of the present invention is used in combination with a catalytic composite including manganese and an iron oxide as its main components in a deodorizing apparatus, the deodorizing apparatus can also deodorize air including sulfur-containing odorous substances such as hydrogen sulfide with high efficiency.

The present invention will be further described by reference to the following examples.

EXAMPLES

Example 1 (Preparation Method 1)

First, ceramic fibers made of silica and alumina, a fine powder of Na-substituted-type zeolite 13X, an organic binder and an inorganic binder were mixed together, and water was added thereto to form a slurry with an appropriate coefficient of viscosity. From this slurry, carrier sheets were formed by the use of a paper-making method, and then dried at a predetermined temperature. Some of the dried carrier sheets were corrugated by means of a corrugator, while the others were not subjected to the corrugation process. One of the corrugated carrier sheets and one of the uncorrugated carrier sheets were joined to each other with an inorganic binder. The joined sheets were used as a pair, and plural pairs were stacked up into a carrier-sheet unit of a honeycomb structure such as shown in FIG. 1. The thus obtained carrier-sheet unit is calcined at a temperature of about 350° C., resulting in a zeolite-ceramic carrier. In the thus prepared zeolite-ceramic carrier with the honeycomb structure, the ceramic fibers constituted the honeycomb framework thereof, and the particles of the zeolite were supported on the surface of and in the interstices between the ceramic fibers. The zeolite-ceramic carrier had a specific surface area of 397 $m^2/g$.

Next, chloroauric acid, ferric nitrate and a solvent were mixed to form an aqueous solution. The zeolite-ceramic carrier prepared in the above manner was immersed in this aqueous solution. In this immersion process, the zeolite particles supported on the surface of and in the interstices between the ceramic fibers of the zeolite-ceramic carrier strongly adsorbed the acidic solution containing the chloroauric acid and iron nitrate. This is because zeolite has the property of strongly adsorbing water with a great dipole moment. Accordingly, the chloroauric acid and iron nitrate were dispersed throughout the zeolite-ceramic carrier at high efficiency; they were supported not only on the surface of the carrier sheets but also in the interstices between the ceramic fibers inside each carrier sheet.

After the immersion process, the zeolite-ceramic carrier having the chloroauric acid and iron nitrate supported thereon was dried at a temperature of about 100° C., and then calcined in air at 400° C. for 30 minutes, resulting in a catalytic composite of the present invention shown in FIG. 1. Referring to FIG. 1, the catalytic composite, denoted by the reference numeral 1, has catalytic sheets 2 each essentially composed of a zeolite-ceramic carrier sheet with gold and ferric oxide supported thereon. The catalytic sheets 2 constitute the honeycomb structure of the catalytic composite 1. The holes of the honeycomb structure serve as vent holes 3 for allowing air to pass therethrough.

In the catalytic composite thus produced, the gold and ferric oxide serving as catalysts were supported not only on the surface of the catalytic sheets but also in the interstices between the ceramic fibers inside the catalytic sheets. The gold content of the catalytic composite was 0.2 percent by weight (i.e., 1 g/liter of the volume of the catalytic composite). The content of the ferric oxide in the catalytic composite was, when converted into an iron-content basis, 1.3 percent by weight.

In the catalytic composite of the present invention, since the ceramic fibers constitute the framework thereof, the specific surface area having catalysts thereon can be made large. In the catalytic composite obtained in this example, the specific surface area (measured by the BET method) was 320 $m^2/g$, which was sufficiently large to provide excellent catalytic activity. On the other hand, in the conventional method where zeolite alone is made into a honeycomb-shaped carrier without using ceramic fibers, the resultant zeolite carrier has a relatively large specific surface area but it has low mechanical strength and requires high production cost.

Example 2 (Preparation Method 2)

First, ceramic fibers made of silica and alumina, a fine powder of Na-substituted-type zeolite 13X, gold, ferric oxide, an inorganic binder and an organic binder were thoroughly mixed, and water was added thereto to form a slurry with an appropriate coefficient of viscosity. From this mixed slurry, catalytic sheets were formed by the use of a paper-making method, and then dried at a predetermined temperature. Some of the dried catalytic sheets were corrugated by means of a corrugator, while the others were not subjected to the corrugation process. One of the corrugated catalytic sheets and one of the uncorrugated catalytic sheets were joined to each other using an inorganic binder. The thus joined sheets were used as a pair, and plural pairs were stacked up into a honeycomb structure, resulting in a catalytic-sheet unit. The catalytic-sheet unit with the honeycomb structure thus obtained was dried at a temperature of about 100° C. and then calcined in the atmosphere at a temperature of 400° C. for 30 minutes, resulting in a catalytic composite of the present invention. The content of the gold in the catalytic composite was 1.1 g/liter (the volume of the catalytic composite). The content of the ferric oxide in the catalytic composite was, when converted into an iron-content basis, 1.5 percent by weight.

In this method, since the mixed slurry to be formed into a catalytic sheet contains catalysts, i.e., gold and ferric oxide, the formation of the sheet and the supporting of the catalysts thereon can be performed in a single step as described above. This eliminates the necessity for separate steps in supporting catalysts on a carrier, thereby simplifying the entire production process. Furthermore, catalytic composites of desired shapes and sizes can be produced from the same mixed slurry.

Example 3 (Preparation Method 3)

First, ceramic fibers made of silica and alumina, a fine powder of Na-substituted-type zeolite 13X, ferric oxide, an inorganic binder and an organic binder were thoroughly mixed, and water was added thereto to form a slurry with an appropriate coefficient of viscosity. From this mixed slurry, ferric oxide-supported carrier sheets were formed by the use of a paper-making method, and then dried at a predetermined temperature. Some of the dried carrier sheets were corrugated by means of a corrugator, while the others were not subjected to the corrugation process. One of the corrugated carrier sheets and one of the uncorrugated carrier sheets were joined to each other using an inorganic binder. The thus joined sheets were used as a pair, and plural pairs were stacked up into a carrier-sheet unit of a honeycomb structure. The thus obtained carrier-sheet unit with the honeycomb structure is then calcined at a temperature of about 350° C., resulting in ferric oxide-supported carrier. In the thus obtained ferric-supported carrier, the zeolite and ferric oxide were supported on the surface of and in the interstices between the ceramic fibers.

Next, an aqueous solution was prepared by adding water to chloroauric acid. The ferric oxide-supported carrier prepared in the above manner was immersed in this aqueous solution, so that chloroauric acid was also supported on the ferric oxide-supported carrier. After immersion, the ferric oxide-supported carrier having the chloroauric acid supported thereon was dried at a temperature of about 100° C., and then calcined in the atmosphere at 400° C. for 30 minutes, resulting in a catalytic composite of the present invention. The content of gold in this catalytic composite was 0.19 percent by weight (i.e., 1 g/liter (the volume of the volume of the catalytic composite)). The content of the ferric oxide in the catalytic composite was, when converted into an iron-content basis, 1.4 percent by weight.

In this method, a zeolite fine powder and ferric oxide are first supported on ceramic fibers and the whole is calcined, and thereafter, gold is supported thereon. Thus, the gold, which serves as a main active component, is covered neither with the zeolite nor the ferric oxide, thereby increasing the catalytic activity of the resulting catalytic composite.

Comparative Example 1

A catalytic composite was prepared in the same manner as in Example 1. except that instead of gold and ferric oxide, oxides of copper (Cu), manganese (Mn) and cobalt (Co) known as catalysts having catalytic activity at low temperatures were supported in the weight ratio of 30:56:14 on the zeolite-ceramic carrier. The content of the catalysts in the resultant catalytic composite was 65 g/liter (the volume of the catalytic composite).

Comparative Example 2

A catalytic composite was prepared in the same manner as in Example 1, except that, instead of gold and a ferric oxide, platinum (Pt) was supported on the zeolite-ceramic carrier. The content of the platinum in the resultant catalytic composite was 1 g/liter (the volume of the catalytic composite).

Evaluation 1

Deodorization tests were performed with the catalytic composites of Example 1 and Comparative Examples 1 and 2 under the following test conditions in order to evaluate the deodorization efficiencies thereof.

| [Test Conditions] |
|---|
| Gas to be deodorized: prepared by adding atmospheric air to a nitrogen gas containing 100 ppm of trimethylamine ((CH$_3$)$_3$N; hereinafter referred to as TMA), thereby diluting the nitrogen gas to a TMA concentration of 50 ppm |
| Space velocity: 12000$^-$h |
| Determination of the TMA concentration of deodorized gas: by gas chromatography |
| Test apparatus: fixed flow system reactor |
| Temperature: room temperature |

In the deodorization test for each catalytic composite, the gas to be deodorized was first allowed to pass through the catalytic composite for a predetermined period of time, after which the catalytic composite was exposed to atmospheric air for about 3 hours. Then, another volume of gas to be deodorized was again allowed to pass through the catalytic composite for another predetermined period of time, after which the catalytic composite was exposed to atmospheric air for another three-hour period. In this manner, a cycle of the deodorization and atmospheric air-exposure processes was repeatedly carried out. In the deodorization test, the TMA concentration of the gas at the outlet of the fixed flow system reactor (i.e., the gas deodorized by the catalytic composite) was determined by the use of gas chromatography. Using the thus determined TMA concentration (herein represented by "Co") and also using the TMA concentration of the gas at the inlet of the reactor (i.e., the initial TMA concentration; herein represented by "Ci"), the deodorization rate (Rc) of the catalytic composite was obtained by the following expression 1:

$$Rc = \frac{Ci - Co}{Ci} \times 100 \, (\%) \qquad (1)$$

Figure 2:
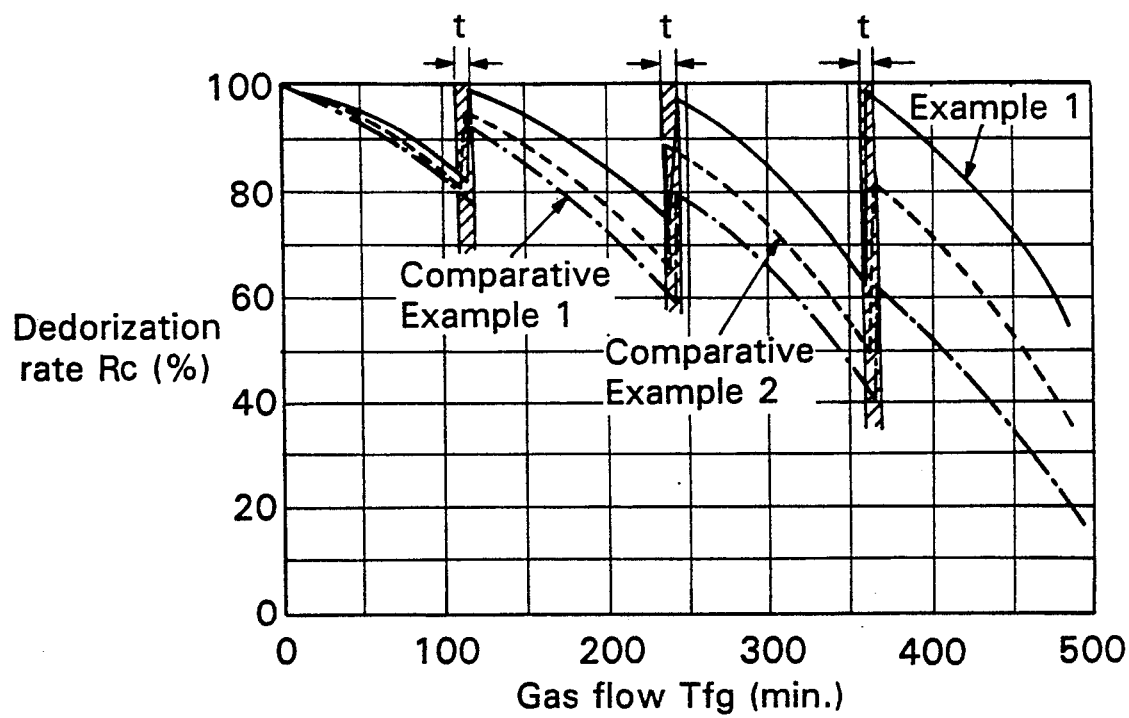
FIG. 2 is a graph showing the deodorization efficiencies of the catalytic composite according to the present invention and of catalytic composites prepared for comparison.

FIG. 2 shows the thus obtained deodorization rates (Rc) of the catalytic composites of Example 1 and Comparative Examples 1 and 2, with respect to the deodorization period (Tfg). Each of the hatched areas in FIG. 2 indicates the three-hour period t for the above-described atmospheric air-exposure process.

As seen from FIG. 2, although the deodorization rate of the catalytic composite of Example 1 decreased with time, the catalytic composite almost completely recovered its deodorization efficiency after each atmospheric air-exposure process. On the other hand, the catalytic composites of Comparative Examples 1 and 2, the deodorization rates of which also decreased with time, recovered their deodorization efficiencies to only a small degree after each atmospheric air-exposure process; their deodorization efficiencies decreased with the repetition of the deodorization and atmospheric air-exposure cycle.

Evaluation 2

Figure 3:
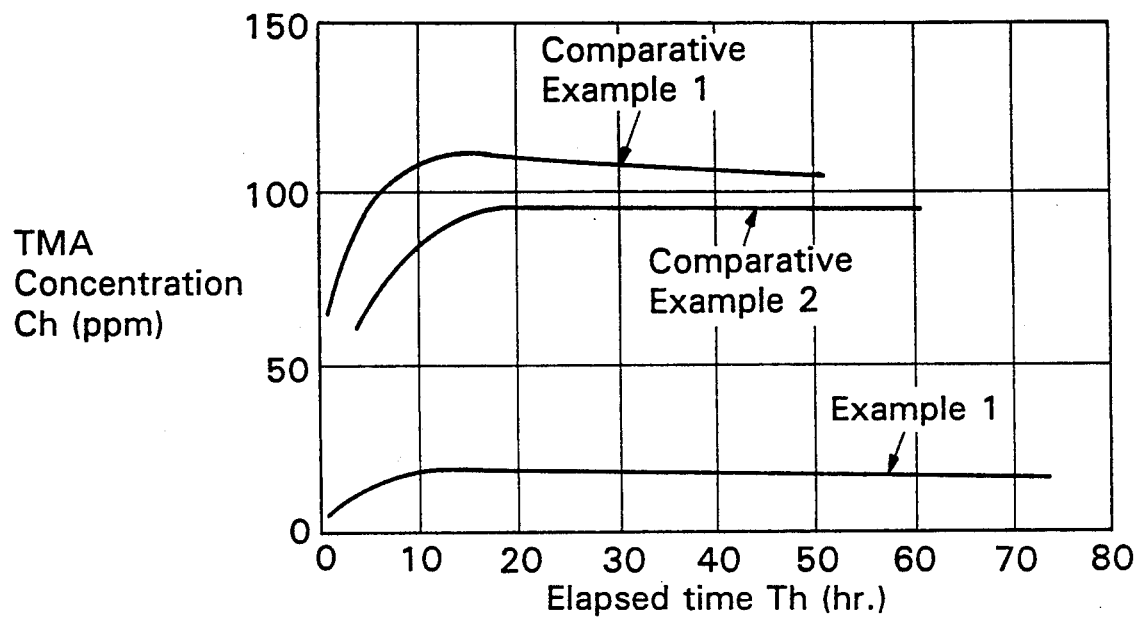
FIG. 3 is a graph showing the release of an odorous substance from the catalytic composites after their deodorization efficiencies shown in FIG. 2 are evaluated.

After the catalytic composites of Example 1 and Comparative Examples 1 and 2 adsorbed TMA in the deodorization tests of Evaluation 1, each catalytic composite having the TMA was subjected to an odor-releasing test as follows: First, the catalytic composite was enclosed together with 15 liters of air in a bag made of a non-adsorptive material. This allows the TMA previously adsorbed by the catalytic composite to be released therefrom into the air in the bag. With the bag kept at room temperature, the TMA concentration of the gas in the bag was measured, for the evaluation of changes in the amount of TMA released from the catalytic composite in accordance with elapsed time. FIG. 3 shows the relationship between the thus measured TMA concentration (Ch) and the elapsed time (Th), with respect to the catalytic composites of Example 1 and Comparative Examples 1 and 2.

As seen from FIG. 3, in each odor-releasing test, the TMA concentration (Ch) of the gas increased for a certain period of time to reach its equilibrium level, and thereafter remained at the equilibrium level even with a further elapse of time. The catalytic composites of Example 1 and Comparative Examples 1 and 2 are not significantly different from one another in the period required to attain this equilibrium level of TMA concentration. However, the equilibrium level attained by the catalytic composite of Example 1 was far lower than those attained by the catalytic composites of Comparative Examples 1 and 2, despite the fact that the amount of TMA previously adsorbed by the catalytic composite of Example 1 was larger than those adsorbed by the catalytic composites of Comparative Examples 1 and 2 in the deodorization tests of Evaluation 1. This demonstrates that a significant part of the TMA previously adsorbed by the catalytic composite of Example 1 was decomposed through oxidation into other substances.

The gas in the bag having the catalytic composite of Example 1 therein was further examined by ion chromatography. As a result, ammonia, which is known as a component of the product usually generated by the dissociation of TMA, was detected in the form of ammonium ion.

Referring back to FIG. 2, as described above, the catalytic composites of Comparative Examples 1 and 2 slightly recovered their deodorization efficiencies after they were exposed to atmospheric air. However, FIG. 3 indicates that these recoveries were not caused by the decomposition of the adsorbed TMA but caused by the release of the TMA into the atmospheric air.

Evaluation 3

The catalytic composites obtained in Examples 1, 2 and 3 were first subjected to the deodorization tests in the same manner as described in Evaluation 1 so that they adsorbed TMA. Thereafter, they were subjected to the odor-releasing tests in the same manner as described in Evaluation 2, for the evaluation of the differences in catalytic activity between the catalytic composites prepared by the three different methods 1, 2 and 3 of the present invention.

Figure 4:
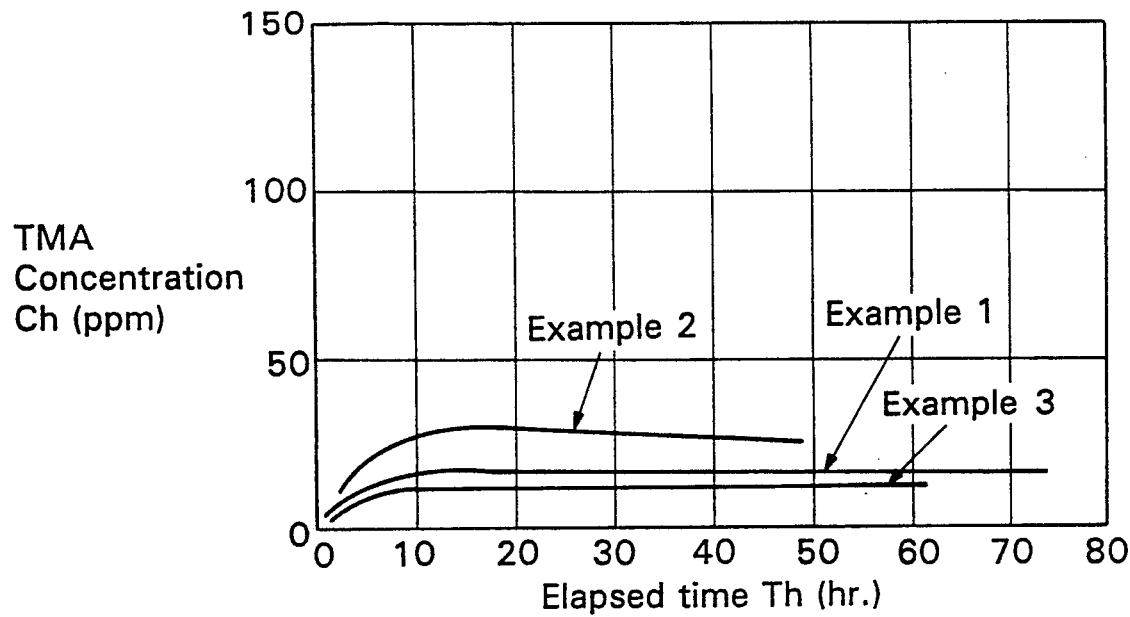
FIG. 4 is a graph showing the release of an odorous substance from catalytic composites prepared by three different methods according to the present invention, after their deodorizing efficiencies are evaluated.

The results of the odor-releasing tests are shown in FIG. 4. As shown in FIG. 4, the equilibrium level of the TMA concentration obtained by the catalytic composite of Example 3 was the lowest, that obtained by the catalytic composite of Example 1 was the second lowest, and that obtained by the catalytic composite of Example 2 was the third. This means that the catalytic activity of the catalytic composite of Example 3 was higher than those of the catalytic composites of Examples 1 and 2. However, compared with the catalytic composites of Comparative Example 1 (including Cu-Mn-Co-based catalysts) and of Comparative Example 2 (including Pt as a catalyst), the equilibrium levels of the TMA concentration obtained by the catalytic composites of Examples 1 and 2 were lower; i.e., the catalytic composites of Examples 1 and 2 exhibited higher catalytic activities as compared with those of Comparative Examples 1 and 2.

As described above, in the preparation method 3, a zeolite fine powder and ferric oxide are first supported on ceramic fibers and the whole is calcined, after which gold is supported thereon. Thus, the gold, which functions as a main active component, is covered neither with the zeolite fine powder nor ferric oxide, thereby increasing the number of active sites in the resultant catalytic composite. Due to such a large number of active sites, the catalytic composite of Example 3 has the highest catalytic activity. The catalytic activity of the catalytic composite of Example 2 is slightly lower than that of the catalytic composites of Examples 1 and 3. But the preparation method 2 described in Example 2 is the simplest of the three methods of the present invention, so that the catalytic composite of Example 2 can be produced at the lowest production cost. Thus, according to the present invention, a suitable method can be selected from the three preparation methods 1 to 3, in consideration of production cost, required deodorization efficiency, and the like.

Example 4

Catalytic composites were prepared in the same manner as in Example 1, except for the use of different aqueous solutions containing chloroauric acid and ferric nitrate in different ratios. Each of the resultant catalytic composites contained gold and ferric oxide in a different ratio.

These catalytic composites were subjected to deodorization tests and odor-releasing tests under the following test conditions.

[Test Condition 1] (Deodorization Test)
Gas to be deodorized:
prepared by adding atmospheric air to a
nitrogen gas containing 100 ppm of TMA,
thereby diluting the nitrogen gas to a TMA
concentration of 50 ppm
Space velocity: 12000$^{-}$h
Determination of the TMA concentration of
deodorized gas: by gas chromatography
Test apparatus: fixed flow-system reactor
Temperature: room temperature
[Test Condition 2] (Odor-releasing Test)
After the deodorization tests were carried
out under Test Condition 1, each catalytic
composite was enclosed together with 10 liter
of air in a vessel made of a non-adsorptive
material, and was maintained at room temperature, so that the TMA adsorbed by the catalytic composite in the previous deodorization
test was released therefrom. The TA concen- -continued tration of the gas in the vessel was measured by gas chromatography at predetermined intervals of time.

In each deodorization test (Test Condition 1), the gas to be deodorized was allowed to pass through the catalytic composite for two hours, and the amount of TMA in the gas detected at the outlet of the fixed flow system reactor (i.e., the amount of TMA in the gas deodorized by the catalytic composite) was determined. Using the thus determined amount (weight) of TMA (herein represented by "mo") and also using the amount (weight) of TMA in the initial gas (i.e., the amount of TMA in the gas fed into the inlet of the reactor; herein represented by "mi"), the TMA adsorption rate (Ra) of each catalytic composite was obtained by the following expression 2:

$$Ra = \frac{mi - mo}{mi} \times 100 \, (\%) \quad (2)$$

In each odor-releasing test (Test Condition 2), the amount of TMA released from each catalytic composite into the air in the vessel was determined from the TMA concentration measured in the above-described manner. Using the thus determined amount of released TMA (represented by "mr") and also using the amount of TMA previously adsorbed by the catalytic composite in the deodorization test (herein represented by "mc", which is given by "mi minus mo"), the TMA releasing rate (Rr) of each catalytic composite was obtained by the following expression 3:

$$Rr = \frac{mr}{mc} \times 100 \, (\%) \quad (3)$$

Figure 5:
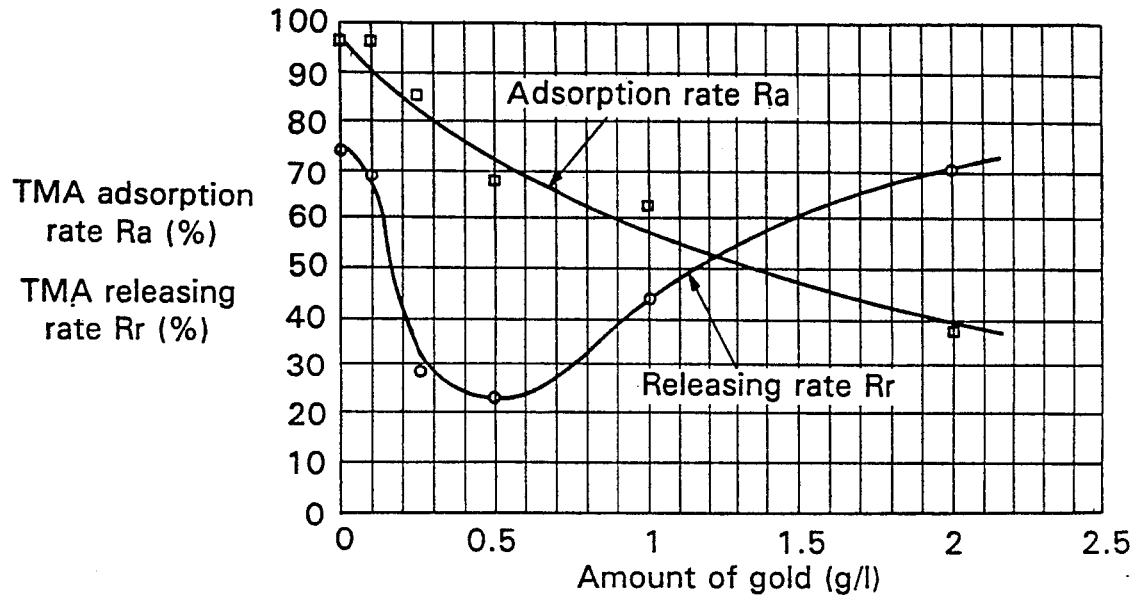
FIG. 5 is a graph showing the adsorption of an odorous substance by catalytic composites according to the present invention containing different amounts of gold, and also showing the release of the odorous substance from these catalytic composites.

FIG. 5 shows the thus obtained TMA adsorption rates (Ra) and TMA releasing rates (Rr) of the catalytic composites containing different amounts of gold.

In this example, for the purpose of comparison, a catalytic composite containing neither gold nor ferric oxide was also prepared and subjected to the deodorization and odor-releasing tests in the same manner as described above. The results are also shown in FIG. 5 as the TMA adsorption and releasing rates at the gold content of "0 g/liter".

The TMA adsorption rate (Ra) of a catalytic composite represents the deodorization efficiency thereof; a catalytic composite exhibiting a higher TMA adsorption rate (Ra) attains higher efficiency in deodorizing the TMA-containing gas. The TMA releasing rate (Rr) of a catalytic composite is the ratio of the amount of the released TMA to that of the TMA previously adsorbed by the catalytic composite, as can be seen from the expression 3. With an increase in the amount of TMA decomposed through oxidation into other substances, the amount of TMA to be released from the catalytic composite decreases, thereby lowering the TMA releasing rate (Rr). Thus, a catalytic composite exhibiting a lower TMA releasing rate (Rr) has a higher catalytic (oxidation) activity for the decomposition of adsorbed TMA into other substances.

As seen from FIG. 5, with an increase in the gold content of the catalytic composite, the TMA adsorption rate (Ra) decreases. The TMA releasing rate (Rr) becomes lowest when the gold content is about 0.5 g/liter. The catalytic composite prepared for comparison by the addition of neither gold nor ferric oxide has a high TMA adsorption rate (Ra), but the TMA releasing rate (Rr) is as high as 75%, which means that 75% of the adsorbed TMA is released therefrom without being decomposed.

When the preferred TMA releasing rate (Rr) is set at 40% or less, the gold content of the catalytic composite is in the range of 0.2 to 0.9 g/liter. When the gold content is in this preferable range, the iron content in the catalytic composite is in the range of 0.3 to 1.5 percent by weight. With this preferable level of the TMA releasing rate (Rr), the catalytic composite of the present invention can be used for a household flush toilet so as to remove recognizable odors therefrom.

Example 5

In the same manner as in Example 1, a zeolite-ceramic carrier of a honeycomb structure was prepared from a slurry containing ceramic fibers, a fine powder of zeolite, an inorganic binder and an organic binder. The zeolite-ceramic carrier thus obtained was then immersed in an aqueous solution of chloroauric acid and ferric nitrate, so that chloroauric acid and ferric nitrate were supported on the zeolite-ceramic carrier. This aqueous solution was prepared to contain chloroauric acid and ferric nitrate at such a concentration that the gold content of the resulting catalytic composite would be 1 g/liter (the volume of the catalytic composite) and that the content of the ferric oxide in the resulting catalytic composite would be 1.8 percent by weight based on the weight of the catalytic composite (when converted into an iron-content basis).

In this example, a plurality of zeolite-ceramic carriers having chloroauric acid and ferric nitrate supported thereon were prepared in the above-described manner, after which they were calcined at different temperatures, resulting in a plurality of catalytic composites.

Each of the catalytic composites thus obtained was subjected to the deodorization test and odor-releasing test in the same manner as described in Example 4. The results are shown in FIG. 6.

Figure 6:
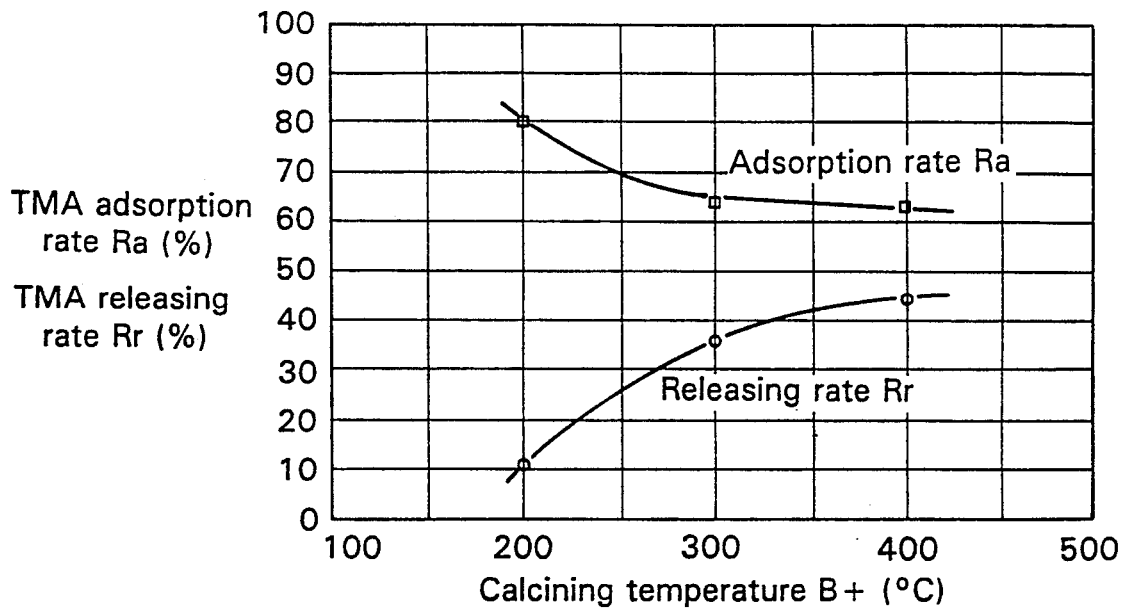
FIG. 6 is a graph showing the adsorption of an odorous substance by catalytic composites according to the present invention prepared by using different calcining temperatures, and also showing the release of the odorous substance from these catalytic composites.

As seen from FIG. 6, with a decrease in the calcining temperature, the TMA adsorption rate (Ra) becomes higher and the TMA releasing rate (Rr) becomes lower. This indicates that, with a lower calcining temperature, the resultant catalytic composite attains higher efficiency in the adsorption and decomposition of TMA. However, when the calcining temperature is 200° C. or lower, there is a possibility that chloride (in the chloroauric acid) and nitrate (in ferric nitrate) will remain in the resultant catalytic composite. When the calcining temperature is 400° C. or more, the crystal structure of the NaX-type zeolite tends to be broken. Furthermore, as described in Example 4, when the TMA releasing rate (Rr) is set at be 40% or lower, the calcining temperature is preferably in the range of 200° to 350° C.

In summary, the catalytic composites of the above-described examples have the following advantages:

(1) Since the catalytic composite includes ceramic fibers as its framework, it is porous and accordingly has a large specific surface area. A zeolite fine powder, gold and an iron oxide such as ferric oxide are supported not only on the surface of the catalytic sheets but also in the interstices of several tens of micrometers between the ceramic fibers inside each catalytic sheet. Thus, the catalytic composite has a large surface area with catalytic activity for the adsorption and decomposition of odorous substances.

(2) Since the catalysts (i.e., gold and iron oxide), and zeolite fine powder are present in the interstices between the ceramic fibers of a reticular structure, the adhesion of the catalysts to the ceramic fibers becomes high, thereby preventing the dropout of the catalysts. Accordingly, the catalytic composite including the catalysts securely supported on the ceramic fibers can be obtained without using conventionally complicated steps for supporting catalysts.

Furthermore, since the catalytic composite includes ceramic fibers as its framework, it has high mechanical strength. Also due to the use of the ceramic fibers, the catalytic composite can be produced at low cost, as compared with the conventional method where zeolite alone is formed into a honeycomb structure.

(3) The zeolite fine powder strongly adsorbs water having a great dipole moment, so that it strongly adsorbs an acidic aqueous solution containing chloroauric acid and an iron salt. As a result, gold and an iron oxide are dispersed efficiently throughout the catalytic composite so that they can be supported in the interstices between the ceramic fibers as well as on the surface of the catalytic sheets. This eliminates the necessity for the conventionally complicated steps of preparing a solution which requires high accuracy in pH control for the supporting of catalysts or the conventionally complicated steps in supporting catalysts, thereby simplifying the entire process of preparing the catalytic composite.

(4) In the second preparation method, the formation of a sheet and the supporting of catalysts thereon can be carried out in a single step. Furthermore, catalytic composites of desired sizes and shapes can be produced from the same mixed slurry.

(5) In the third preparation method, zeolite and an iron oxide are first supported on ceramic fibers and the whole is calcined, after which gold is supported thereon. This makes it possible to support gold on the zeolite and iron oxide. Thus, the gold, serving as a main active component, is covered neither with the zeolite nor the iron oxide, thereby increasing the catalytic activity of the resulting catalytic composite.

Example 6

Figure 7:
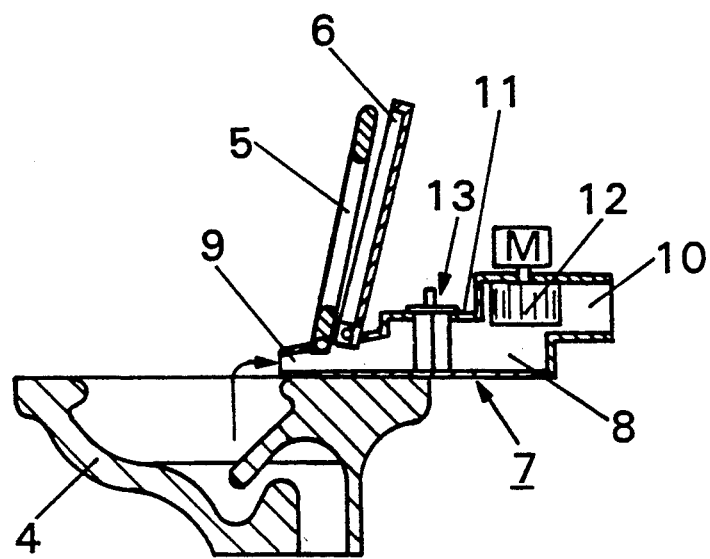
FIG. 7 is a sectional view showing a deodorizing apparatus according to the present invention which is installed on a toilet stool.
Figure 8:
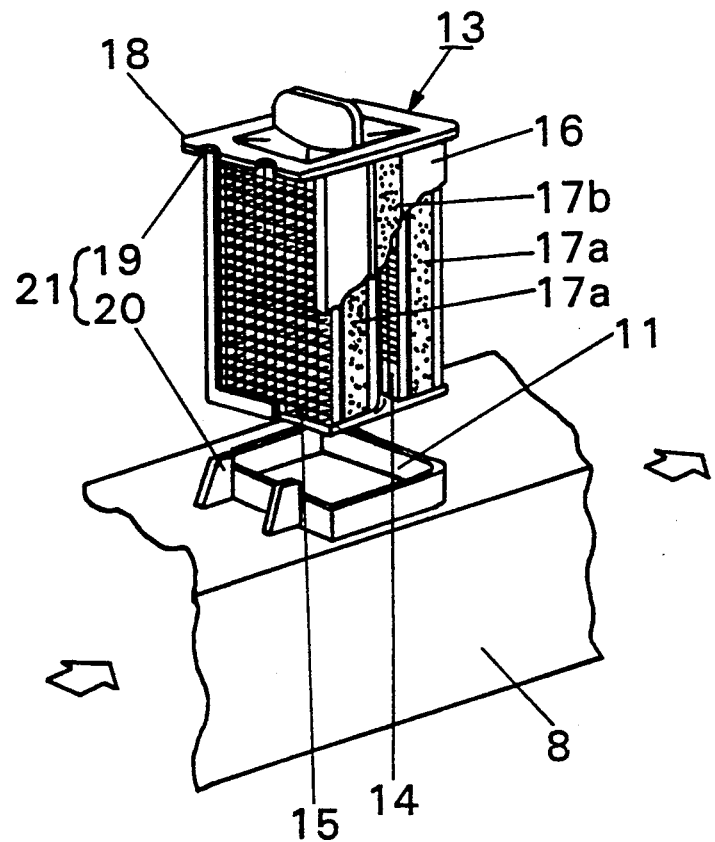
FIG. 8 is an enlarged view showing the main part of the deodorizing apparatus of FIG. 7.

A deodorizing apparatus according to the present invention will now be described by reference to FIGS. 7 and 8. FIG. 7 shows the deodorizing apparatus of the present invention installed on a toilet stool. FIG. 8 is an enlarged view showing the main part of the deodorizing apparatus.

Referring to FIG. 7, the reference numeral 4 denotes a toilet bowl, 5 a toilet seat, and 6 a toilet seat lid. The deodorizing apparatus, denoted by the reference numeral 7, includes a duct 8 having an inlet 9 and an outlet 10, and a fan 12 disposed in the duct 8 to suck air thereinto. The deodorizing apparatus 7 also includes a deodorizer unit 13 detachably placed in the duct 8. In this deodorizing apparatus 7, air in the toilet bowl 4 is sucked into the duct 8 through the inlet 9 by means of the fan 12, and is allowed to pass through the deodorizer unit 13 to be deodorized, and then the deodorized air is discharged out of the duct 8 through the outlet 10.

The detailed construction of the deodorizer unit 13 is shown in FIG. 8. As seen from FIG. 8, the duct 8 has a deodorizer-insertion hole 11 through which the deodorizer unit 13 is inserted into or taken out of the duct 8. The arrows in FIG. 8 show the direction of the air flowing through the duct 8. The deodorizer unit 13 includes a first deodorizer 14, a second deodorizer 15, and a case 16 in which the deodorizers 14 and 15 are contained. The first deodorizer 14 is a catalytic composite which includes a porous zeolite-ceramic carrier having ceramic fibers as its framework with zeolite supported thereon and also includes gold and ferric oxide as catalysts supported mainly on the porous zeolite-ceramic carrier (this type of catalytic composite is hereinafter referred to as a "zeolite/Au-Fe catalytic composite"). The second deodorizer 15 is a catalytic composite which includes manganese and ferric oxide as main catalytic components (this type of catalytic composite is hereinafter referred to as a "Mn-Fe catalytic composite"). Both the deodorizers 14 and 15 are of a honeycomb structure so that the air flowing through the duct 8 can pass through the holes of their honeycomb structures. When the deodorizer unit 13 is placed in the duct 8, as shown in FIG. 8, the first deodorizer 14 is positioned downstream of the second deodorizer 15 in the direction of the air flow.

The first and second deodorizers 14 and 15 are each provided with an elastic band 17a on the peripheral surface thereof, so that the air to be deodorized is prevented from leaking out through the gap between the case 16 and each deodorizer 14 or 15. The elastic band 17a also functions as a buffer between the case 16 and each deodorizer 14 or 15. Similarly, the outer wall of the case 16 is provided with an elastic band 17b. When the deodorizer unit 13 is placed in the duct 8, the elastic band 17b is interposed between the outer wall of the case 16 and the inner wall of the duct 8, so that it also functions as a buffer between the case 16 and the duct 8, and prevents the air from leaking out.

The case 16 of the deodorizer unit 13 has a flange 18 provided with a recess 19. The periphery of the deodorizer-insertion hole 11 of the duct 8 is provided with a projection 20. When the deodorizer unit 13 is placed in the duct 8 the projection 20 is fitted into the recess 19, thereby constituting a fitting portion 21. This construction ensures that the deodorizer unit 13 will be properly directed into the duct 8 to allow the first deodorizer 14 to be positioned downstream of the second deodorizer 15 in the direction of the air flow.

The operation of the deodorizing apparatus of the present invention will now be described.

When a user sits on the toilet seat 5, the fan 12 starts to rotate to suck the air containing odorous substances from the toilet bowl 4 into the duct 8 through the inlet 9 thereby creating an air flow through the duct 8 from the inlet 9 to the outlet 10. In the duct 8, the sucked odorous air flows into the deodorizer unit 13 to be deodorized.

In general, air in a toilet bowl contains two types of odorous compounds; sulfur-containing compounds such as hydrogen sulfide and mercaptans, and nitrogen-containing compounds such as ammonia, amines and indole. In the deodorizing apparatus, the air containing the two types of odorous compounds is first brought into contact with the second deodorizer 15. The second deodorizer 15 (Mn-Fe catalytic composite) selectively adsorbs the sulfur-containing compounds in the air. Since the nitrogen-containing compounds are not absorbed by the Mn-Fe catalytic composite, the nitrogen-containing compounds in the air pass through the second deodorizer 15 without being adsorbed thereby, and accordingly comes into contact with the first deodorizer 14. The first deodorizer 14 (zeolite/Au-Fe catalytic composite) adsorbs the nitrogen-containing compounds remaining in the air because zeolite in the zeolite/Au-Fe catalytic composite selectively adsorbs molecules having a large dipole moment by the electrostatic force of the cations thereof. Since the first deodorizer 14 includes ceramic fibers as its framework, the zeolite particles having catalysts (i.e., the gold and ferric oxide) supported thereon are present not only on the surface of the catalytic sheets constituting the deodorizer 14 but also in the interstices between the ceramic fibers inside the catalytic sheets. Thus, the first deodorizer 14 has catalytic active sites not only on the surface of its catalytic sheets but also in the inside of each catalytic sheet. This enables the adsorption of a large amount of nitrogen-containing compounds.

In the above-described manner, the two types of odorous compounds can be efficiently removed from the air by the two deodorizers 14 and 15. The air thus deodorized is then discharged out of the duct 8 through the outlet 10. Since the first and second deodorizers 14 and 15 have a honeycomb structure, the pressure loss which tends to be caused by the passage of air can be prevented.

The odorous compounds adsorbed by the two deodorizers 14 and 15 are decomposed into other substances by the catalytic activities of the respective deodorizers. Although the mechanism of the decomposition has not been clarified yet, the catalytic activities of the first deodorizer 14 (zeolite/Au-Fe catalytic composite) and of the second deodorizer 15 (Mn-Fe catalytic composite) can be briefly explained as follows: The nitrogen-containing compounds present on and/or adsorbed by the zeolite/Au-Fe catalytic composite are decomposed through the interaction between the odorous compounds and the gold and ferric ions and also through the interaction between the odorous compounds and active oxygen introduced into the porous zeolite-ceramic carrier of the catalytic composite. The sulfur-containing compounds adsorbed by the Mn-Fe catalytic composite are oxidized through the interaction between the odorous compounds and the manganese and ferric ions in the coexistence of oxygen at ordinary temperature. As a result, the sulfur-containing compounds are gradually decomposed so that most parts of the product obtained through the decomposition is released from the surface of the Mn-Fe catalytic composite. The extremely small part of the decomposition product remains on the Mn-Fe catalytic composite. Namely, dissociative adsorption is carried out. In this manner, most of the odorous compounds adsorbed by the two different catalytic composites are decomposed and released from the surface thereof. This causes the surface of each catalytic composite to be exposed again to the odorous air for the adsorption of another amount of odorous compounds. Thus, the deodorizers 14 and 15 employed in the deodorizing apparatus of the present invention can attain excellent deodorization efficiency for a long time, as compared with conventional deodorizers such as those using active carbons. The long lifetime of the deodorizers eliminates the necessity for the frequent replacement of deodorizers. Because of the excellent deodorization efficiency, the volume of the deodorizer required for the deodorizing apparatus can be reduced. Furthermore, unlike conventional deodorizing apparatuses, the deodorizing apparatus of the present invention requires no auxiliary devices such as an ozone generator or a catalyst heater. Thus, the deodorizing apparatus of the present invention can be made small in size and can be produced at low cost.

The above-described decomposition of odorous compounds adsorbed by the deodorizers proceeds at a relatively low reaction rate. The deodorizers first adsorb the odorous compounds in a short period of time, and then gradually decompose them into odorless substances. For the decomposition process, the deodorizers are required to be exposed to atmospheric air containing no odorous compounds for a predetermined period of time. Therefore, the deodorizing apparatus is suitable for intermittent use rather than continuous use, and also suitable for the deodorization of air containing odorous compounds at a relatively low concentration. Thus, the deodorizing apparatus of the present invention can attain excellent deodorization efficiency when used in a household flush toilet. For example, assuming that the average number of people in one family is four including females, and that each person sits on the toilet seat for feces discharge for 10 minutes and each female sits on the toilet seat for urine discharge for 2 minutes, the deodorizing apparatus operates for about one hour per day in total. This means that the deodorizers of the deodorizing apparatus can be exposed to the atmospheric air for about 23 hours per day, which is sufficiently long for the decomposition of the adsorbed odorous substances.

In general, sulfur (S) in sulfur-containing compounds poisons catalysts such as gold and an iron oxide. In the deodorizing apparatus of the present invention, the second deodorizer 15 for adsorbing sulfur-containing compounds is disposed upstream of the first deodorizer 14 including the gold and ferric oxide as catalysts. With this arrangement, the sulfur-containing compounds in the odorous air can be adsorbed by the second deodorizer 15 before the air reaches the first deodorizer 14. This greatly reduces the possibility of causing sulfur to poison the catalysts (the gold and ferric oxide) contained in the first deodorizer 14. Furthermore, in the deodorizing apparatus of the present invention, as shown in FIG. 8, the flange 18 of the deodorizing unit 13 is provided with the recess 19 into which the projection 20 of the deodorizer-insertion hole 11 is fitted, thereby preventing any improper insertion of the deodorizer unit 13. This ensures the above-mentioned proper positional arrangement of the first and second deodorizers 14 and 15.

In this example, the deodorizer unit 13 includes two deodorizers 14 and 15 for respectively adsorbing nitrogen-containing compounds and sulfur-containing compounds. According to the present invention, the two deodorizers can be made different from each other in volume in accordance with the ratio of nitrogen-containing compounds to sulfur-containing compounds in the air to be deodorized. The use of two deodorizers, however, is not essential to a deodorizing apparatus of the present invention. When the air to be deodorized mainly contains one of the two types of odorous compounds, a deodorizer unit including only one of the two deodorizers can be used in the deodorizing apparatus.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A catalytic composite for deodorizing odorous gases comprising:
   ceramic fibers;
   finely powdered zeolite supported on the surface of and in the interstices between the ceramic fibers; and
   gold and an iron oxide both supported mainly on the finely powdered zeolite, the catalytic composite being formed as to allow a gas to pass therethrough.

2. A catalytic composite according to claim 1, wherein the ceramic fibers, the zeolite, the gold and the iron oxide constitute a sheet, the sheet being in the form of a sheet unit of a ventilated structure having a plurality of vent holes.

3. A catalytic composite according to claim 2, wherein the ventilated structure is a honeycomb structure.

4. A catalytic composite according to claim 1, wherein the content of the gold is in the range of 0.2 to 0.9 g/liter (the volume of the catalytic composite), and the content of the iron is in the range of 0.3 to 1.5 percent by weight based on the weight of the catalytic composite.

5. A catalytic composite according to claim 1, which is obtained by being calcined at a temperature of 200 to 350° C.

6. A method for preparing a catalytic composite for deodorizing odorous gases, comprising the steps of:
   preparing a carrier sheet from a slurry by the use of a paper making method, the slurry mainly containing ceramic fibers, an inorganic binder and a fine powder of zeolite;
   forming the carrier sheet into a carrier-sheet unit of a ventilated structure with a plurality of vent holes, and calcining the carrier-sheet unit, thereby obtaining a carrier;
   immersing the carrier in an aqueous solution of a water-soluble gold compound and a water-soluble iron salt so that the water-soluble gold compound and the water-soluble iron salt are supported on the carrier; and
   drying and calcining the carrier having the water-soluble gold compound and water-soluble iron salt supported thereon.

7. A method according to claim 6, wherein the gold content of the catalytic composite is in the range of 0.2 to 0.9 g/liter (the volume of the catalytic composite), and the iron content of the catalytic composite is in the range of 0.3 to 1.5 percent by weight based on the weight of the catalytic composite.

8. A method according to claim 6, wherein the calcination of the carrier having the a water-soluble gold compound and water-soluble iron salt supported thereon is performed at a temperature of 200° to 350° C.

9. A method according to claim 6, wherein the ventilated structure is a honeycomb structure.

10. A method for preparing a catalytic composite for deodorizing odorous gases, comprising the steps of:
    preparing a catalytic sheet from a slurry by a paper-making method, the slurry containing ceramic fibers, an inorganic binder, a fine powder of zeolite, gold and an iron oxide; and
    forming the catalytic sheet into a catalytic-sheet unit of a ventilated structure with a plurality of vent holes, and then drying and calcining the catalytic-sheet unit.

11. A method according to claim 10, wherein the gold content of the catalytic composite is in the range of 0.2 to 0.9 g/liter (the volume of the catalytic composite), and the iron content of the catalytic composite is in the range of 0.3 to 1.5 percent by weight based on the weight of the catalytic composite.

12. A method according to claim 10, wherein the calcination of the catalytic-sheet unit is performed at a temperature of 200° to 350° C.

13. A method according to claim 10, wherein the ventilated structure is a honeycomb structure.

14. A method for preparing a deodorizing catalytic composite, comprising the steps of:
    preparing an iron oxide-supported carrier sheet from a slurry by the use of a paper-making method, the slurry containing ceramic fibers, an inorganic binder, a fine powder of zeolite and an iron oxide;
    forming the iron oxide-supported carrier sheet into a carrier-sheet unit of a ventilated structure with a plurality of vent holes, and then drying and calcining the carrier-sheet unit, thereby obtaining an iron oxide-supported carrier; and
    immersing the iron oxide-supported carrier in an aqueous solution containing a water-soluble gold compound so that the water-soluble gold compound is supported on the iron oxide-supported carrier, and then drying and calcining the iron oxide-supported carrier with the water-soluble gold compound thereon.

15. A method according to claim 14, wherein the gold content of the catalytic composite is in the range of 0.2 to 0.9 g/liter (the volume of the catalytic composite), and the iron content of the catalytic composite is in the range of 0.3 to 1.5 percent by weight based on the weight of the catalytic composite.

16. A method according to claim 14, wherein the calcination of the iron oxide-supported carrier with the water-soluble gold compound thereon is performed at a temperature of 200° to 350° C.

17. A method according to claim 14, wherein the ventilated structure is a honeycomb structure.

* * * * *